US011973670B2

(12) United States Patent
Rochon

(10) Patent No.: US 11,973,670 B2
(45) Date of Patent: *Apr. 30, 2024

(54) AREA EFFICIENT TRAFFIC GENERATOR

(71) Applicant: Accedian Networks Inc., Saint-Laurent (CA)

(72) Inventor: Steve Rochon, Brossard (CA)

(73) Assignee: ACCEDIAN NETWORKS INC., Saint-Laurent (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/514,235

(22) Filed: Oct. 29, 2021

(65) Prior Publication Data

US 2022/0052932 A1 Feb. 17, 2022

Related U.S. Application Data

(63) Continuation of application No. 17/034,379, filed on Sep. 28, 2020, now Pat. No. 11,196,647, which is a (Continued)

(51) Int. Cl.
| | |
|---|---|
| *G06F 11/00* | (2006.01) |
| *G06F 11/30* | (2006.01) |
| *G06F 11/34* | (2006.01) |
| *G06F 13/362* | (2006.01) |
| *H04L 43/026* | (2022.01) |
| *H04L 43/50* | (2022.01) |
| *H04L 47/283* | (2022.01) |
| *H04L 43/08* | (2022.01) |

(52) U.S. Cl.
CPC ........ *H04L 43/026* (2013.01); *G06F 11/3003* (2013.01); *G06F 11/3006* (2013.01); *G06F 11/3452* (2013.01); *G06F 11/349* (2013.01); *G06F 13/3625* (2013.01); *H04L 43/50* (2013.01); *H04L 47/283* (2013.01); *H04L 43/08* (2013.01)

(58) Field of Classification Search
CPC ............. G06F 11/3006; G06F 11/3452; G06F 11/349; G06F 11/30; G06F 11/3003
See application file for complete search history.

(56) References Cited

U.S. PATENT DOCUMENTS

| | | | | |
|---|---|---|---|---|
| 7,751,421 B2 * | 7/2010 | Chi | ......................... | H04L 43/50 370/374 |
| 2002/0065938 A1 * | 5/2002 | Jungck | .................... | H04L 47/19 709/246 |
| 2013/0318280 A1 * | 11/2013 | Dalal | .................. | G06F 13/1605 710/316 |

FOREIGN PATENT DOCUMENTS

EP 2432170 A1 * 3/2012 ............. H04L 43/08

\* cited by examiner

*Primary Examiner* — Katherine Lin

(57) ABSTRACT

A packet and inspection system for monitoring the performance of one or more flows on a packet network comprises a processor and memory coupled to each other and to a network bus. The memory stores instructions to be executed by the processor and data to be modified by the execution of the instructions. A processor-controlled arbiter is coupled with the processor and the network bus, and upon reception of a packet on the bus or prior to transmission of a packet on the bus for one of said flows, the arbiter requests execution by the processor of selected instructions stored in the memory by providing the processor with the address of the selected instructions in the memory. The memory provides the processor with data associated with the selected instructions, and the processor modifies the data upon execution of the selected instructions.

9 Claims, 2 Drawing Sheets

Related U.S. Application Data continuation of application No. 16/229,280, filed on Dec. 21, 2018, now Pat. No. 10,826,800, which is a continuation of application No. 14/515,164, filed on Oct. 15, 2014, now Pat. No. 10,250,464.

AREA EFFICIENT TRAFFIC GENERATOR

CROSS REFERENCE TO RELATED APPLICATIONS

This application is a continuation of U.S. patent application Ser. No. 17/034,379, filed Sep. 28, 2020, now allowed, which is a continuation of U.S. patent application Ser. No. 16/229,280, filed Dec. 21, 2018, now U.S. Pat. No. 10,826,800, which is a continuation of U.S. patent application Ser. No. 14/515,164, filed Oct. 15, 2014, now U.S. Pat. No. 10,250,464, all of which are hereby incorporated by reference herein in their entirety.

FIELD OF THE INVENTION

The present disclosure relates to performance monitoring and traffic generation on networks.

BRIEF SUMMARY

In accordance with one embodiment, a packet generation and inspection system is provided to monitor the performance of one or more flows on a packet network. The system includes a processor and a memory coupled to each other and to a bus of the packet network. The memory stores instructions to be executed by the processor and data to be modified by the execution of the instructions. A processor-controlled arbiter is coupled with the processor and the network bus, and upon reception of a packet on the bus or prior to transmission of a packet on the bus for one of said flows, the arbiter requests execution by the processor of selected instructions stored in the memory by providing the processor with the address of the selected instructions in the memory. The memory provides the processor with data associated with the selected instructions, and the processor modifies the data upon execution of the selected instructions. The instructions stored in the memory are preferably multiple operating codes, and the data to be modified by the instructions is data corresponding to each of the operating codes.

In one implementation, the packet generation and inspection system includes a traffic generator and a traffic inspector coupled to the processor and the arbiter. The traffic generator creates and sends test packets to the arbiter, and the traffic inspector receives and analyzes test packets to gather performance statistics and sends the statistics to the arbiter. The processor is preferably implemented as a field programmable gate array (FPGA). The addresses of the instructions stored in the memory may be offsets that partition the memory in different segments that can be used to execute different functions.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the disclosure will become apparent upon reading the following detailed description and upon reference to the drawings.

Figure 1:
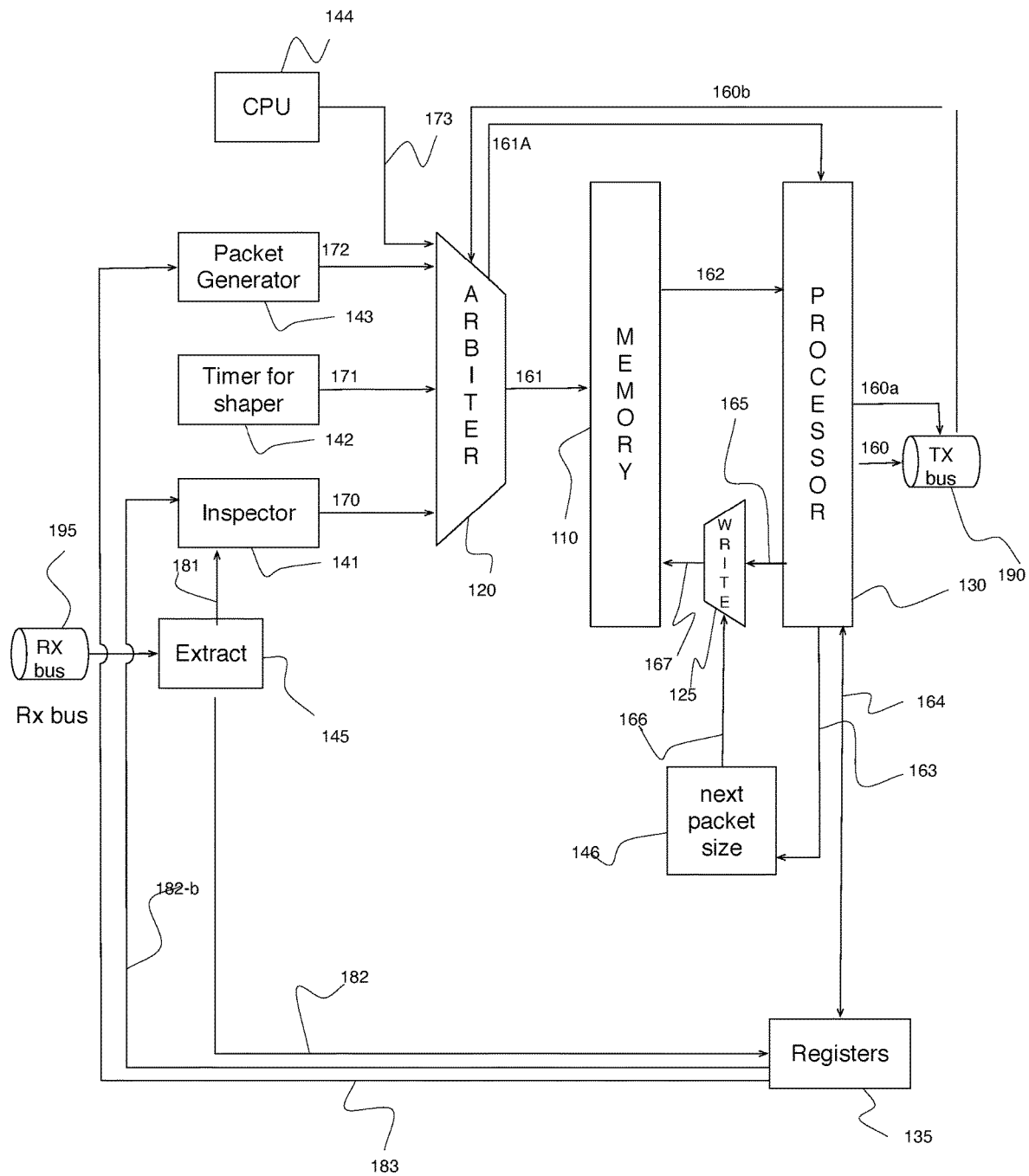
FIG. 1 is a diagram of the architecture of an area efficient packet generator.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

Performance monitoring is an essential function for network management and engineering. The performance monitoring function requires the implementation of traffic generator and traffic inspector modules on network devices. Some of the network devices comprise only very small Field Programmable Gate-Arrays (FPGAs), which are generally almost full in term of logic and memory. In general, the use of an Application Specific Integrated Circuit (ASIC) is too expensive and does not allow any flexibility for future evolution.

The traffic generator module creates and sends in real-time a series of test packets of any configurable size and at any configurable speed up to full line-rate. The traffic inspector module analyses and monitors the test packets in order to gather statistics such as latency (min, max, average), jitter, packets lost, duplicate packets, out of order, bandwidth etc.

Existing modules are too large to be implemented on small FPGAs. There is a need to design scalable modules that can be implemented on small FPGAs and that support multiple flows simultaneously without any distributed memory. There is also a need to change the behavior of the modules by software configuration without the need to modify the FPGA code for a specific application.

Another existing solution is to use very large external memories. The module generates packets and writes them into memory. The hardware reads sequentially the contents of the memory to transmit packets back to back or by time interval. On the receive side, packets are saved memory upon arrival and then analyzed later by software. However, several network devices do not have resources (e.g., space, cost and power) to use this solution.

Using software only to generate and analyze packets is also not a viable solution because it is not possible to transmit the packets at the line rate.

There is a need to use fewer FPGA resources to offer more features in a scalable manner, such that it is possible to support a large number of flows without significant impact in terms of FPGA logic. There is a need to support multiple applications with more context while providing more flexibility at low cost. There is also a need to change the behavior of the modules or the formats of the packets without requiring a new load on the FPGA.

As a generic embodiment, an FPGA executes different functions by executing operations that are programmed in a memory along with the corresponding data. The memory is configured using a CPU with a sequence of operating codes (OPCODE) along with its corresponding data as per the following generic example:

| Address | Operating code | Data |
| --- | --- | --- |
| Address 1 | OPCODE 1 | Data 1 |
| Address 2 | OPCODE 2 | Data 2 |
| ... | ... | ... |
| Address n | OPCODE n | Data n |

Depending on the size of the OPCODE describing the command and the size of the data may vary but the total is limited to the width of the memory.

The address can be the absolute memory address, but generally it is addressed using an offset to partition the memory in different segments that can be used to execute different functions. The processor is given an address or offset and executes the instructions (OPCODE) starting at that address in memory. The meaning of the OPCODE along with the processing required to its associated data (and optionally external registers) is pre-programmed in the processor.

The embodiment is now exemplified using a performance monitoring implementation which includes a traffic generator module and a traffic inspector module. These modules generally perform the following functions:
- traffic shaping to regulate each test flow at a predetermined bandwidth pattern (rate and burst size).
- packet size computation to compute the size of the next packet to be generated based on a predetermined pattern (e.g., pseudo-random, sequential).
- create a packet with all the appropriate information which includes static information constant for all packets and variable information (e.g., header including checksum, sequence number, timestamp, padding).
- statistics processing (e.g., total packets, total bytes, last size, first timestamp, last timestamp).
- timer to limit test duration in bytes, packets or time.
- pseudo-random generator to optionally calculate padding and next packet size.

Each function is built with its own logic and memory. A traffic generator can support a number of streams or flows in parallel. Each of them has its own characteristics. In an FPGA, where distributed memory is not available, the cost in logic to support multiple flows is very expensive.

Referring to FIG. 1, a single memory (e.g., dual-port RAM) 110 contains all information to build and manage packet generation on all flows. The memory comprises a mix of instructions and corresponding data for each of the instructions, which are programmed at 173 via a CPU 144. A centralized arbiter 120 is used to access the memory to read addresses at 161 which then trigger a processor 130 at 162 to process instructions and associated data. The processor 130 may process instructions to send slices of packets at 160 on a transmission bus (TX bus) 190 along with slice status at 160a (e.g., destination port, Start of Packet, End of Packet, middle packet, bytes valid for the last slice).

The instructions for the generation of the packet may also include debiting the shaping buckets to indicate that a packet of a given size is generated or calculating a Cyclic Redundancy Check (CRC) to send with the packet.

The processor 130 may send information at 163 to a function to compute the size of the next packet to be sent at 146, which can be random or sequential or follow any type of algorithm. The size of the next packet is then written back into memory 110 via a write arbiter 125 which arbitrates the write access to the memory 110 between the processor 130 write access 165 and the function that calculates the size of the next packet 146. The processor 130 writes into memory 110 updates to the shaper buckets, duration, statistics etc. The processor 130 also indicates via a register 135 that a new packet can be generated for a given flow 183.

The packet generator 143 is used to generate and transmit a new packet for a given flow by triggering a read 172 to the arbiter 120 for the instruction set in the memory 110, which is executed by the processor 130 to generate a new packet. When the TX bus 190 does not indicate a full signal (AFULL=0), the packet generator 143 triggers the processor 130 to transmit packets for the active flows that have sufficient tokens in their shaping bucket(s). The instruction set includes an update to the test duration and to the shaping bucket counter(s).

A timer 142 function elapses to trigger at 171, via the arbiter 120, the processor 130 to execute a set of instructions to update, if required, the shaping bucket.

On the receive (RX) side, packets are either returning via the network from being generated by the module earlier (e.g., two-way measurement) or have been generated by another source (one-way measurement). When a packet for a given flow 181 is received on the receive bus (Rx bus) 195, relevant information for the packet 182 (such as flow number, sequence number, Time of Arrival (TOA), packet generation timestamp) is extracted 145 and placed in registers 135. The inspector function is notified 181 by signal to indicate that statistics processing can be performed for a specific flow and whether the packet is valid or errored (e.g. different statistics can be computed in both cases). The inspector triggers the arbiter 120 at 170 to schedule the processing 130 of the related instructions by providing the address 162 in the memory of the instructions. The processor 130 provides feedback 182-b to the inspector to indicate that processing of a received packet is completed. The inspector can initiate the processing of the following packet.

The arbiter 120 also provides the processor with a signal indicative of which function 143, 142, 141 is sending the address to the instructions as the meaning of the instructions can be different depending upon which function is processed.

The width of memory used can vary and is generally selected to be optimized to the FPGA upon which the module is implemented. In this example a 36-bit wide memory is used. Instructions are defined by a minimum of 4 bits, providing a maximum 32-bits of associated data. Instructions that use 64-bits variables (e.g. statistics) can be divided into two 32-bits registers.

The memory is configured in dual port mode that can be accessed concurrently. One port is for read only 161 and the other is for write only 167.

Packet's slices are created and sent on the bus 190 and packet generation instructions are executed to transmit the next packet. The size of the packet slices depends on the width of the transmission bus 160 and larger slices may require larger memory.

Different instructions are supported such as add, subtract, copy, transmit and receive from bus. Other instructions can also be supported such as latching for external information (e.g. current time) or shift register (ex. to write 64 bits timestamp per 16 bits slice).

The processor 130 can configure 183 the packet generator 143 via registers 135 to jump to an address when a counter rolls-over. Multiple jump addresses can be supported to execute different instructions depending on a condition. For example, two jump addresses could optionally be used to execute different code depending upon whether the packet to generate contains an odd or even number of bytes. The processor 130 selects the right address to send to the packet generator 143 via registers 135 to trigger a loop on the same address during a number of cycles (ex. for padding);

The length of the testing can be limited in duration or number of packets or number of bytes. In the case of a limit in duration, a few timing bits are reserved in memory 110 and are compared when a new packet is sent. The difference between the current time and the time the last packet of the same flow was sent is used to subtract to the duration in time of the test. The duration value is then written back into memory 110 to be used for the next packet.

In the case of a test duration expressed in number of packets, the duration value is decremented by either the packet size or just by one, each time a packet is transmitted.

In both cases, when the duration counter becomes negative, the shaping bucket size is forced to a zero value and the instruction address used to update the bucket is set to NOOP, this way there are never any credits added and no packets can be transmitted for that flow. The shaper bucket and update instructions are reconfigured when a new test is started. There is no synchronization needed between the test flows. Tests can be started and stopped at any time.

Some instructions are capable of self-modification. For example, the jitter can be calculated only if two packets are received since it is the delta between the two measured latency. For the first packet of a test cycle, the instruction is interpreted as a no-operation (NOOP). Similarly, in the case of time duration, the first time a packet is sent, the duration is decremented by zero. However, when the subsequent packets are received, the instructions allow computing different latency measures (e.g. min, max, average).

The instructions in the memory 110 can be updated as necessary to modify the behavior of the module.

Figure 2:
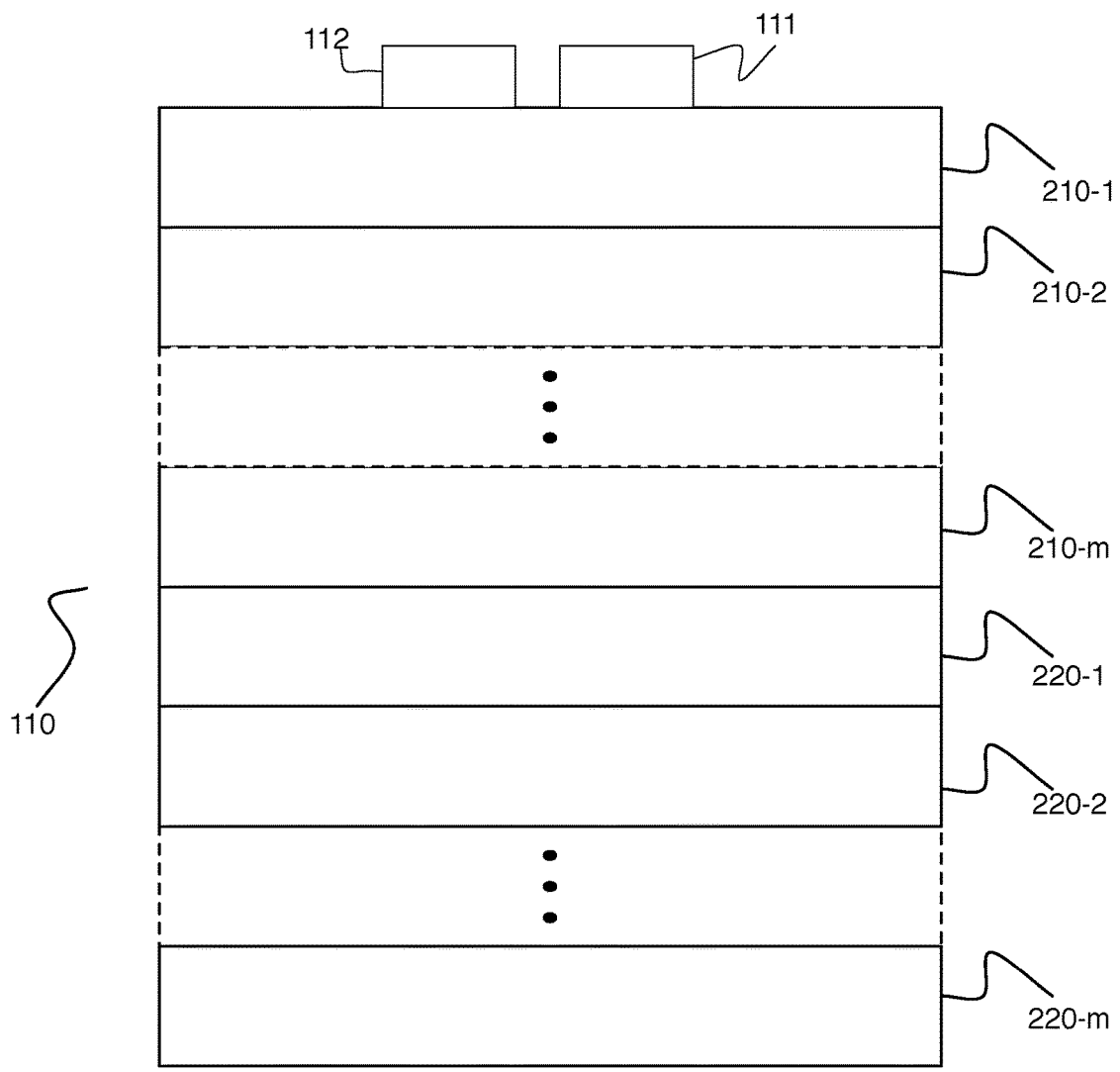
FIG. 2 is a diagram of the memory division between flows.

Referring to FIG. 2, an example of memory partitioning is shown. The memory 110 is divided into two main sections, one for packet generation 210 and one for packet inspection 220. The two sections can be of the same or different size. The packet generation section is divided into n spaces 210-1 . . . 210-n, to support n flows. The packet inspection section is divided into m spaces 220-1 . . . 220-m, to support the reception and statistics on m flows. Optionally, the memory can have other sections to support other functions handled by the arbiter 120.

To minimize the interconnection logic between registers and memory, most functions are managed through two mathematical functions in parallel (addition and subtraction). There is a multiplexer for selecting the input data for each functions and another to select between both results in order to write it in a register, at a memory address and/or transmit slice of data. When it is necessary to make a calculation and at the same time to copy a value without modification forcing a subtraction by zero can be performed to achieve the copy function. For example, a packet slice can be transmitted with a given sequence number and at the same time, the sequence number can be incremented.

The CPU function is used to periodically collect information, such as statistics, on ongoing tests as well as configure the different set of instructions to be processed for a flow, to start and stop a test. It generally only performs read or write actions on memory 110. The CPU could optionally be configured to generate the execution of periodical instructions.

At each cycle, the arbiter 120 chooses which module 141, 142, 143, 144 can trigger the processor 130 to execute its instructions from memory 110. The time between reading and writing is constant to avoid collisions, except for the generation of the next packet size, which is done randomly and written in memory when the processor is not writing into the memory 110. Random memory writes may need an undetermined number of cycles, but the number is limited.

When packets are received the inspector function 141 triggers the execution of instructions by the processor 130 to compute statistics such as: minimum latency, maximum latency, average latency, minimum jitter, maximum jitter, average jitter, maximum GAP, duplicate, out of order, bandwidth. The statistics are maintained in the memory 110.

As per FIG. 2, the memory 110 is divided into n segments 210-1, 210-n. Each segments maintains the information/ instructions for a flow. One segment 210-1 comprises all the information required to generate and inspect the test packets along with the instructions (or microcode) required to be performed by all the modules. Each flow has its own instruction set and therefore a different behavior can be achieved on each flow. However, it is possible to have a common set of instructions for a group of flows in order to further reduce the amount of memory required by simultaneously accessing an instruction and data memory.

Referring back to FIG. 1, priorities can be assigned to the functions 141, 142, 143, 144. For example, the packet generator 143 can be assigned the highest priority, followed by the inspector 141, then the shaper 142 and the lowest priority assigned to the CPU 144. The arbiter 120 provides access to the memory 110 based on these priorities. For example, packet generation 143 is always treated with priority to avoid under-run, however, if the TX bus has accumulated enough slices to transmit, then the packet generator is halted and the processor executes instructions for other functions 141, 142.

Divide instructions and associated data to increase only the data and not the width of the instructions.

In the context of multi-functions, instead of having each dedicated registers, it would be possible to use stack machine principle.

The embodiments described herein can also be used for encapsulating packets.

Add a header and footer to a received packet before forwarding.

It is also possible to encapsulate monitored packets by a remote device. Packets are encapsulated with a header indicating the destination with a received timestamp. Original frames can be truncated to a maximum length.

The embodiments described herein allow for flexible management of statistics.

The statistics can also be transmitted to an external collector at a periodic way (ex. every 100 ms) without any software intervention.

It is also possible to use the same embodiment described herein to modify packets by implementing different OPCODEs.

As an example of the embodiment, the following memory addresses can be reserved for a flow to maintain:

For example to send a packet, there are several subcommands:

| OPCODE | Information |
| --- | --- |
| 0x1 | Main command to generate packet |
| 0x2 | Keep the packet size in Register 2 (REG2) and copy the seed in a register REG3. |
| 0x3 | Decrement Shaper Period Bucket. If negative, request a shaper credit update |
| 0x6 | Decrement duration by value in Register 1. Deactivate flow is negative |
| 0x9 | Copy value of Shaper configuration credit in Register 3 (REG3). |

| OPCODE | Information |
| --- | --- |
| 0xA | This is the value to be credited at 0x3B Copy the value of Shaper configuration period (0x3A) at the offset Shaper Period Bucket (0x39) to reinitialize the period after expiry. |
| 0xB | Flow number and sequence number increment |
| 0xD | Statistic counter (LSB) (with bit for remainder) (+REG1) |
| 0x8 | Statistic counter (MSB) (Add the remainder) |
| 0xE | Bucket Duration-Deactivate the shaper when the value is negative |
| 0xF | Bucket Shaper debit from REG1 or credit from REG3 @ 0x05 |

For each flow, there is a flag (shaper_vect) indicating whether the shaper credit bucket has credits. When there are no packets to send, the shaper_vect of each flow is checked and a flow with the flag set is selected. Another flag (shaper_en) can also be used to indicate whether we can add credits to the shaper credit bucket. The processor reads the first instruction at offset 0X0. This offset contains, amongst other things, the information indicating the packet destination. The packet_ready indicator for that port is activated and the next address 0x1 for the flow is read when the port is available (AFULL=0). At this point one packet slice can be sent to the port. Each flow can have a different destination port and congestion on a port does not affect the transmission on other ports.

The shaper_vect is updated when the flow is activated and there is a debit or credit of the Shaper Credit Bucket for that flow.

The register 0x3F is used by all the ports to activate and deactivate a flow independently using two flags, shaper_vect and shaper_en. There is a mask for each flow. For example, to activate flow #0 and deactivate flow #2, 0X51 is written in 0X3F.

The activation of a flow sets shaper_vect and shaper_en to 1, the deactivation sets them to 0.

The base period for the shaper is set, in this example, to 40 clock cycles which is 320 nanoseconds at 125 Mhz.

Each 320 nanoseconds, a flag is set to indicate that the shaper period buckets of all flows with shaper_en=1 should be checked. Shaper period bucket is decremented until it becomes negative, then the shaper configuration credit is added to the shaper credit and shaper_vect is set to 1. Shaper Period Bucket is updated with the Shaper_configuration_period. All the commands are contained in central memory 110, the processor state machine only knows the address where to find the commands for each flow.

The offset values, the instructions and/or the sequence of instructions can be modified to meet different requirements or achieve different functionality.

Although the algorithms described above including those with reference to the foregoing flow charts have been described separately, it should be understood that any two or more of the algorithms disclosed herein can be combined in any combination. Any of the methods, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine-readable instructions represented in any flowchart depicted herein can be implemented manually as opposed to automatically by a controller, processor, or similar computing device or machine. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. A system to monitor performance of one or more flows on a packet network, said system comprising:
   a memory comprising a plurality of operating codes and a plurality of associated data;
   a centralized arbiter accessing said memory to trigger a processor to execute one or more functions pre-programmed in the processor corresponding with one or more of said plurality of operating codes and one or more of said plurality of associated data;
   wherein said one or more functions generate a test packet to be inserted in one of said one or more flows; and
   wherein said one or more functions are managed via an addition operation and a subtraction operation in parallel.

2. The system of claim 1 in which said processor is implemented as a field programmable gate array (FPGA).

3. The system of claim 1 further comprising a shaping bucket debited to control an amount of test packets generated.

4. A method to monitor performance at a network device coupled to one or more flows in a packet network, said method comprising:
   storing, in a memory, a plurality of operating codes and a plurality of associated data;
   arbitrating access to said memory and executing, by a processor coupled to said memory, one or more functions pre-programmed in the processor corresponding with one or more of said plurality of operating codes and one or more of said plurality of associated data; and generating a test packet to be inserted in one of said one or more flows; and wherein said one or more functions are managed via an addition operation and a subtraction operation in parallel.

5. The method of claim 4 in which said processor is implemented as a field programmable gate array (FPGA).

6. The method of claim 4 further comprising debiting a shaping bucket to control an amount of test packets generated.

7. The system of claim 1, wherein a copy function is performed by forcing a subtraction by zero.

8. The method of claim 4, wherein a copy function is performed by forcing a subtraction by zero.

9. A non-transitory computer-readable medium comprising instructions that when executed by a processor, configure the processor to:

store, in a memory, a plurality of operating codes and a plurality of associated data;

arbitrate access to said memory and executing, by a processor coupled to said memory, one or more functions pre-programmed in the processor corresponding with one or more of said plurality of operating codes and one or more of said plurality of associated data;

generate a test packet to be inserted in one of one or more flows in a packet network; and wherein said one or more functions are managed via an addition operation and a subtraction operation in parallel.

* * * * *